United States Patent
Herr et al.

(10) Patent No.: US 6,311,936 B1
(45) Date of Patent: Nov. 6, 2001

(54) HOSE RETAINER

(75) Inventors: Joel L. Herr; Troy A. Johnson, both of Newton; Gary B. Jackovin, Ankeny, all of IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/364,561

(22) Filed: Jul. 30, 1999

(51) Int. Cl.$^7$ ................. D06F 37/00; F16L 3/12
(52) U.S. Cl. ............ 248/75; 248/68.1; 248/74.1; 68/208; 138/107
(58) Field of Search .................. 248/75, 79, 300, 248/76, 77, 78, 90, 87, 314, 315, 316.1, 316.7, 74.1, 74.2, 74.3, 68.1; 24/336, 339; 138/119, 106, 107; 285/135.1, 135.2, 135.3; 68/208

(56) References Cited

U.S. PATENT DOCUMENTS

| | | | |
|---|---|---|---|
| D. 252,610 | * 8/1979 | Miavitz | D8/356 |
| D. 376,095 | * 12/1996 | Curtis | D8/356 |
| D. 394,801 | * 8/1998 | Blocher | D8/395 |
| 565,418 | * 8/1896 | Allen | 248/49 |
| 1,279,006 | * 9/1918 | Rose | 4/568 |
| 1,713,901 | * 5/1929 | Hanson | 24/130 |
| 1,816,301 | * 7/1931 | Sundell | 248/75 |
| 2,034,558 | * 3/1936 | Bronson | 285/61 |
| 2,426,479 | * 8/1947 | Wohlhieter | 248/74.3 |
| 2,786,483 | 3/1957 | Warhus . | |
| 2,954,194 | * 9/1960 | Alfano | 248/75 |
| 3,441,986 | * 5/1969 | Pritchard | 248/74.2 |
| 3,630,195 | * 12/1971 | Santomieri | 248/74.1 |
| 3,667,712 | * 6/1972 | Furgueson | 248/75 |
| 3,860,978 | * 1/1975 | Wirth | 248/74.1 |
| 4,138,747 | * 2/1979 | Zijlstra | 4/286 |
| 4,151,864 | 5/1979 | Thurman | 138/106 |
| 4,163,457 | 8/1979 | Rickel et al. | 137/216 |
| 4,318,519 | 3/1982 | Blevins | 248/79 |
| 4,407,472 | * 10/1983 | Beck | 24/339 |
| 4,606,735 | * 8/1986 | Wilder et al. | 248/74.2 |
| 4,870,988 | * 10/1989 | Hood, Jr. et al. | 248/79 |
| 4,903,922 | * 2/1990 | Harris, III | 248/75 |
| 5,110,075 | * 5/1992 | Reid et al. | 248/79 |
| 5,311,753 | * 5/1994 | Kanao | 68/208 |
| 5,316,246 | * 5/1994 | Scott et al. | 248/68.1 |
| 5,772,166 | * 6/1998 | Adams | 248/231.81 |

FOREIGN PATENT DOCUMENTS

| | | | |
|---|---|---|---|
| 1169408 | * 5/1964 | (DE) | 68/208 |
| 123266 | * 9/1979 | (JP) | 68/208 |
| 1085991 | * 5/1986 | (JP) | 68/208 |
| 13720 | * 3/1988 | (JP) | 68/208 |
| 3063497 | * 3/1988 | (JP) | 68/208 |

* cited by examiner

*Primary Examiner*—Anita King
*Assistant Examiner*—Jon Szumny
(74) *Attorney, Agent, or Firm*—Zarley, McKee, Thomte, Voorhees & Sease

(57) ABSTRACT

A hose retainer is provided to maintain a hose in a gooseneck shape. The retainer includes opposite rings which retentively engage portions of the hose adjacent the gooseneck. The retainer is molded or stamped from plastic so as to have a flat one-piece construction. A tab is provided on the retainer and is adapted to be received in a slot on the back of a washing machine to hold the hose close to the machine during shipping and storage.

12 Claims, 4 Drawing Sheets

HOSE RETAINER

BACKGROUND OF THE INVENTION

FIELD OF THE INVENTION

All washing machines include a drain hose, which drains water from the tub. In residential machines, the drain hose typically discharges into a standpipe behind the washing machine. The end of the hose is formed into a U-shape or gooseneck, with the inside crest of the gooseneck resting in the end of the standpipe. The goose neck shape can be preformed into the hose or maintained by a retainer.

Prior art hose retainers have been made from wire or plastic. The prior art retainers are bent or formed into curves to form the hose into the goose neck shape. Multiple piece retainers are disclosed in U.S. Pat. Nos. 2,786,483, 4,151,864 and 4,318,519. A one-piece wire hose retainer is disclosed in U.S. Pat. No. 4,163,457.

The shapes and construction of the prior art retainers increases the manufacturing costs, as well as the assembly time in forming the hose into the goose neck shape. For example, in each of the above-cited prior art patents, the hose must be threaded through the rings at each end of the retainer.

Accordingly, a primary objective of the present invention is the provision of an improved retainer for the hose of a washing machine.

Another objective of the present invention is a provision of a hose retainer that is stamped or molded from plastic.

A further objective of the present invention is a provision of a hose retainer that has a one-piece construction.

Another objective of the present invention is a provision of a hose retainer which can be quickly and easily installed on the hose to form the hose into a goose neck shape.

Another objective of the present invention is the provision of a hose retainer that is economical to manufacture and durable in use.

These and other objectives become apparent from the following description of the invention.

SUMMARY OF THE INVENTION

The hose retainer of the present invention is a flat plastic member having a pair of rings or openings for retentively engaging two portions of a hose so as to form the hose into a gooseneck between the two retained portions. The rings are spaced apart by a web extending therebetween. In one embodiment, the web includes an opening such that the hose retainer can slide over the curved gooseneck, thereby eliminating the step of separately threading the end of the hose through each retainer. In another embodiment, the rings are in the form of clips with open sides for receiving the respective hose portions. A tab is provided on the retainer and is adapted to be received within a slot on the back wall of the washing machine so as to support the hose adjacent the back wall for shipping and storage. The hose retainer of the present invention is particularly adapted for use with the drainage of a washing machine, but can also be used on other hoses so as to form a gooseneck adjacent the end of the hose.

DETAILED DESCRIPTION OF THE INVENTION

Figure 1:
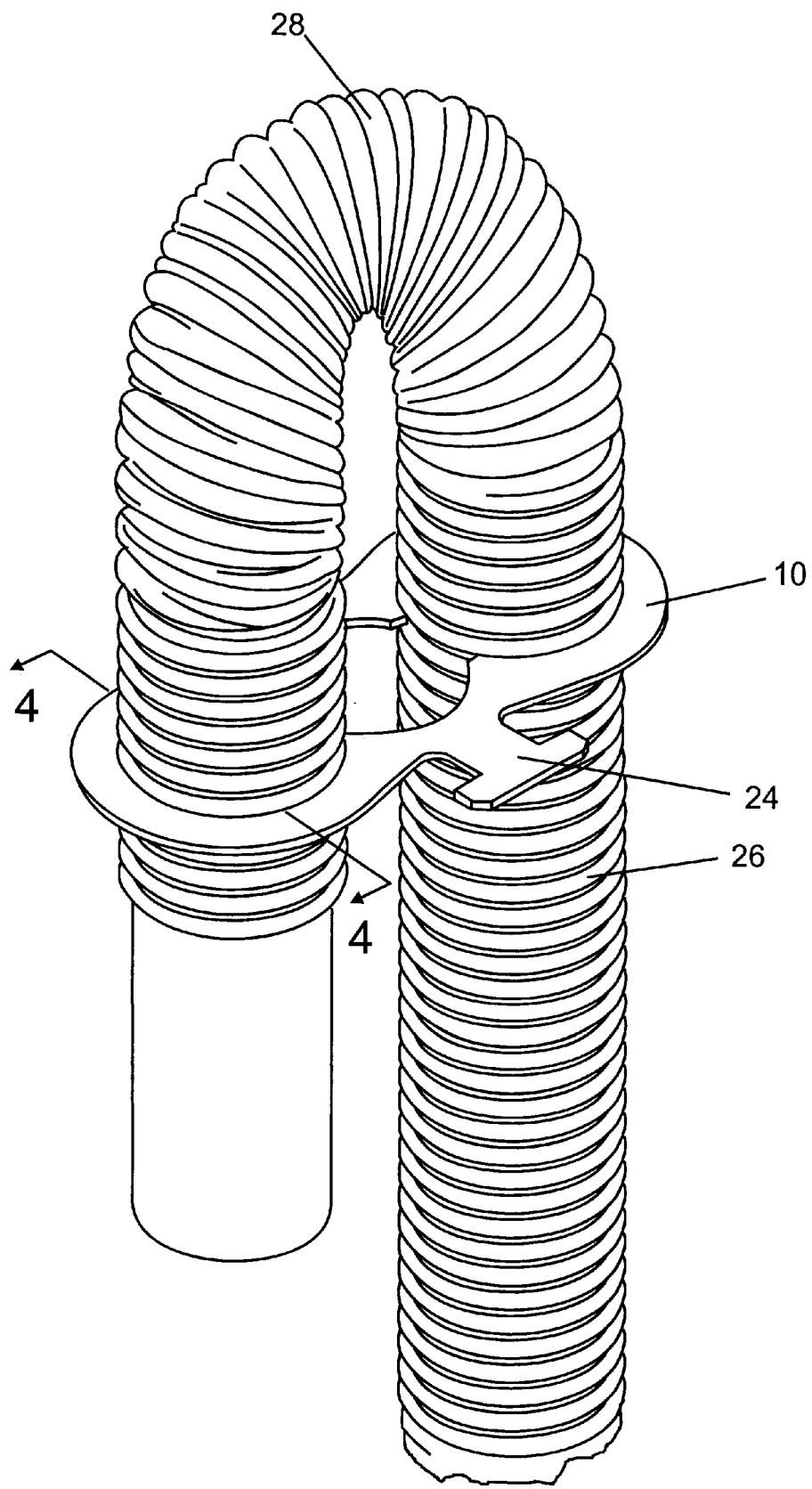
FIG. 1 is a perspective view of a first embodiment of the hose retainer of the present invention positioned on a hose to form a gooseneck in the hose.
Figure 2:
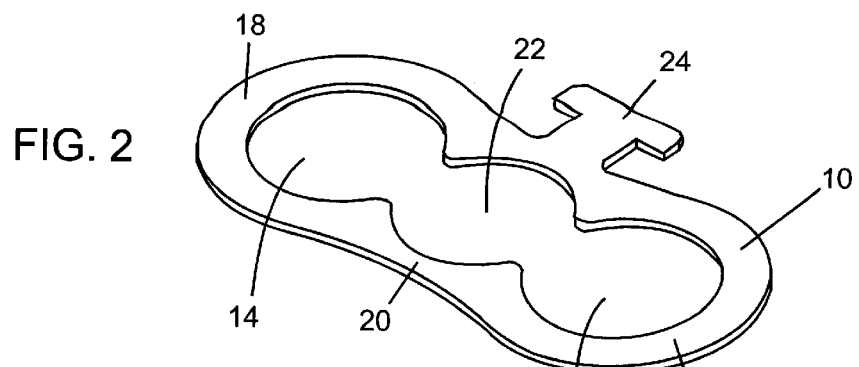
FIG. 2 is a perspective view of the retainer.
Figure 3:
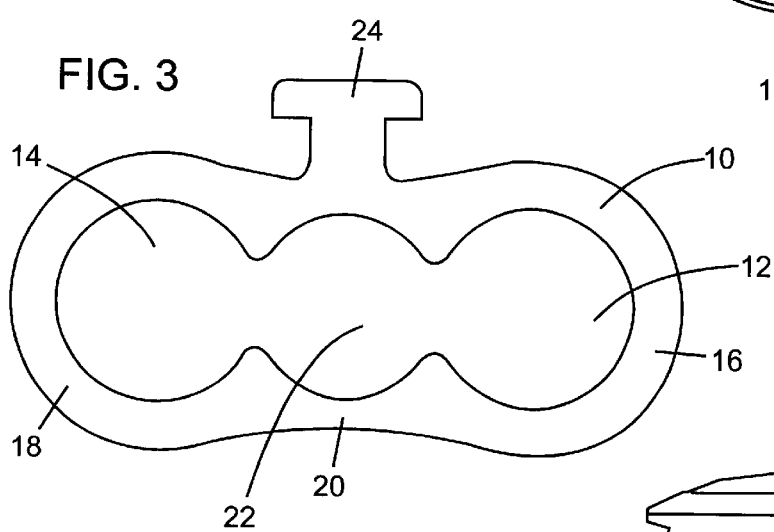
FIG. 3 is a plan view of the retainer.

A hose retainer according to the present invention is generally designated by the reference numeral 10 in FIGS. 1–5. The retainer 10 is a thin flat plastic member, which may be molded or stamped so as to have a one-piece construction. The retainer 10 includes first and second openings 12, 14 formed therein so as to define first and second rings 16, 18 respectively. A web 20 extends between the rings 16, 18. The web includes a hole 22 intersecting the first and second openings 12, 14, such that the first and second rings 16, 18 are C-shaped with the open sides of the C's facing towards one another. A tab 24 extends from the web 20.

Figure 4:
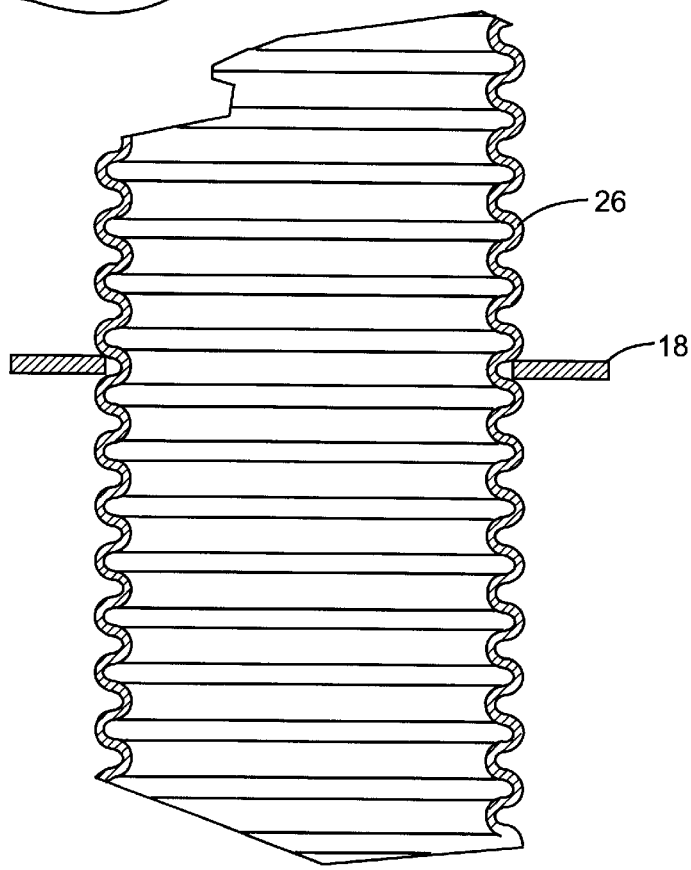
FIG. 4 is a sectional view taken along lines 4—4 of FIG. 1.

In use, a hose 26, such as a washing machine drain hose, is formed into a gooseneck or U-shape 28. The retainer 10 fits over the curved gooseneck 28 of the hose 26 such that the rings 16, 18 substantially encircle respective portions of the hose, thereby retaining the hose 26 in the gooseneck 28. Alternatively, the end of the hose 26 can be extended through the openings 12, 14 so as to position the retainer 10 on the hose. The retainer 10 is sufficiently thin so as to be received through adjacent corrugations on the hose, as shown in FIG. 4.

Figure 5:
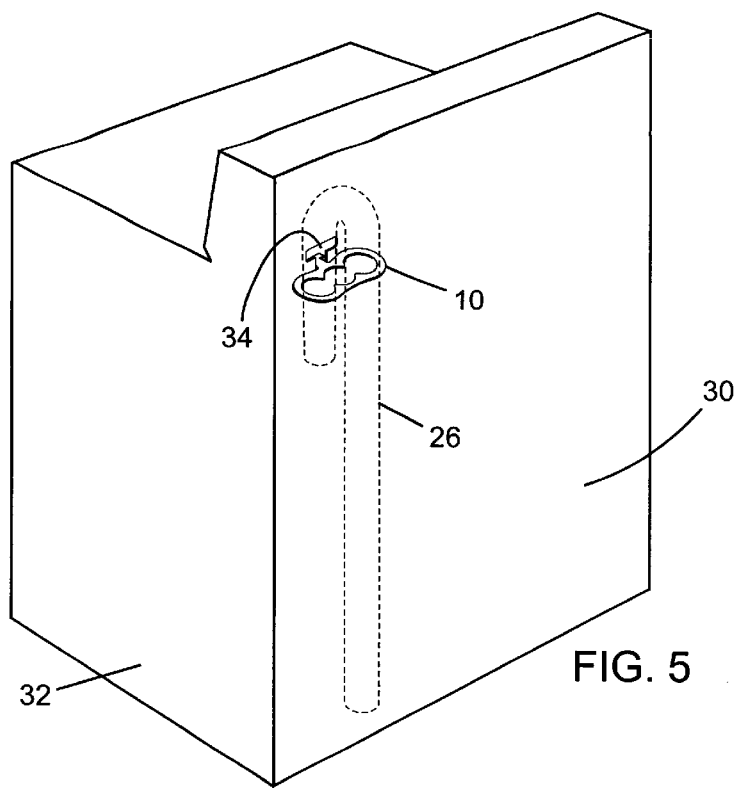
FIG. 5 is a view of the back wall of a washing machine with the retainer clip of the present invention secured thereto.

The back wall 30 of the washing machine 32 includes a slot 34. The tab 24 is adapted to fit within the slot 34, thereby holding the hose adjacent to the back wall 30 of the washing machine 32, as shown in FIG. 5, during shipping and storage. Preferably, the slot 34 is T-shaped, so the tab 24 can fit into the head of the T and then slide downwardly for retention in the leg of the T.

Figure 6:
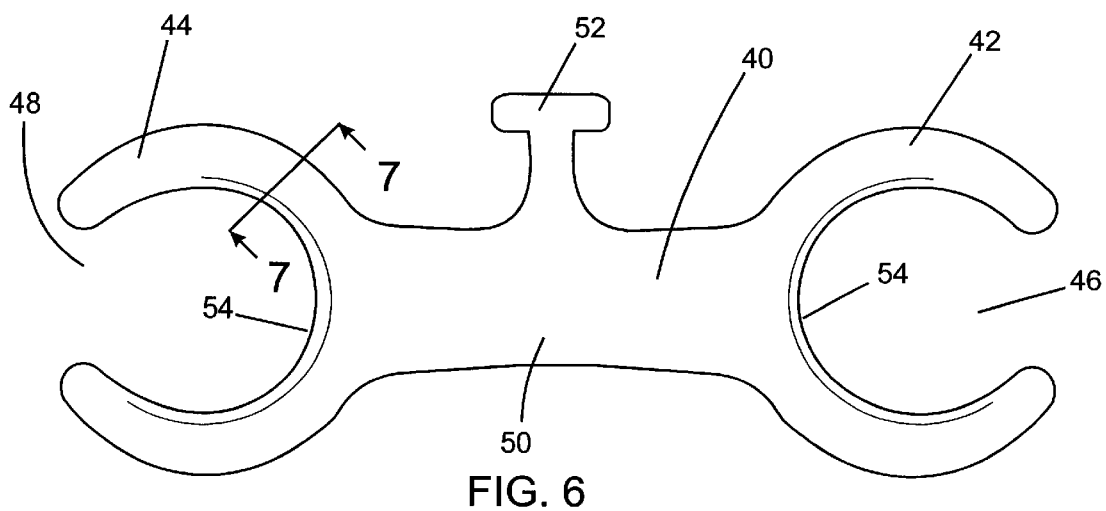
FIG. 6 is a plan view of a second embodiment of the hose retainer of the present invention.
Figure 7:
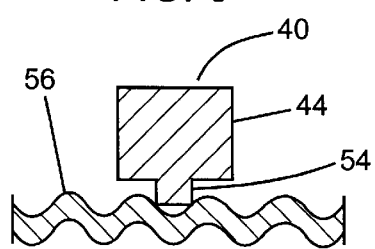
FIG. 7 is a sectional view taken along lines 7—7 of FIG. 6 with the hose positioned in the retainer.

A second embodiment of the hose retainer is designated by the reference numeral 40 in FIGS. 6 and 7. The retainer 40 has a one-piece construction and is made from stamped or molded plastic. The retainer 40 includes opposite C-shaped rings or clips 42, 44. The open ends 46, 48 of the rings 42, 44 face away from one another. A web 50 extends between the rings 42, 44. A tab 52 extends from the web 50 for receipt in the slot 34 on the back wall 30 of the washing machine 32, as described above with respect to the first embodiment hose retainer 10. The inner perimeter of the rings 42, 44 includes a reduced-diameter ridge 54. Ridge 54 is sized so as to be received within a groove between corrugations in a corrugated hose 56. The rings 42, 44 are snap fit around the resilient hose portions as the hose is formed into the gooseneck. The end of the hose 66 does not have to be separately threaded through each of the rings 42, 44.

Figure 8:
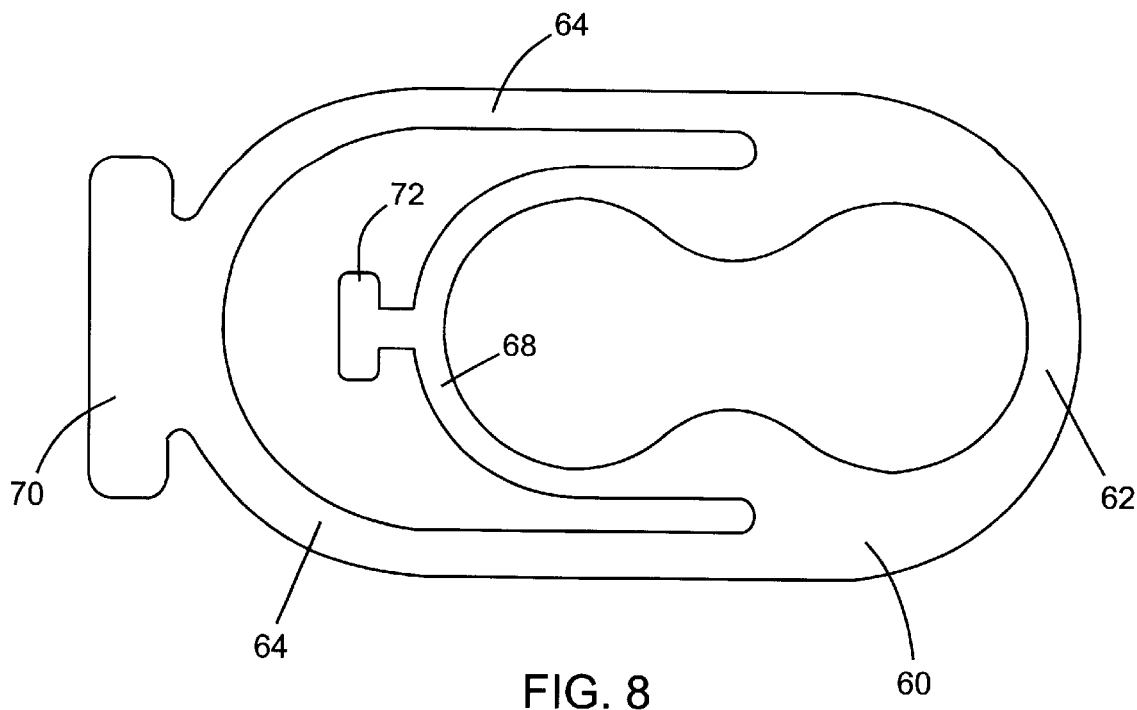
FIG. 8 is a plan view of a third embodiment of the present invention.
Figure 9:
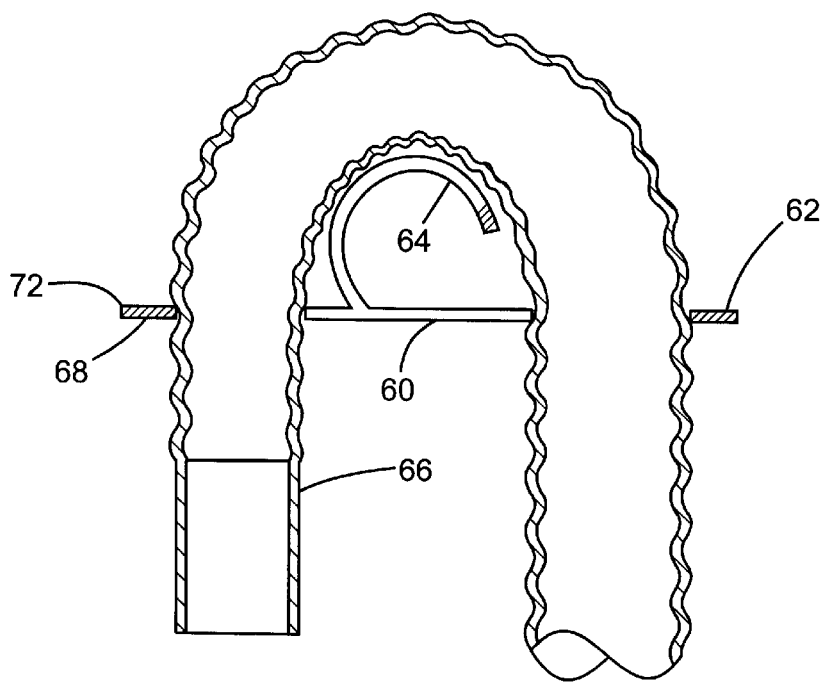
FIG. 9 is a sectional view showing the third embodiment in position on a hose.

A third embodiment of a hose retainer according to the present invention is generally designated in FIGS. 8 and 9 by the reference numeral 60. The retainer 60 is a flat one-piece construction made from stamped or molded plastic. The retainer 60 includes rings 62, 68 adapted to engage portions of the hose 66 so as to maintain the hose 66 in a gooseneck configuration. To assemble, the end of the hose 66 is first threaded through the ring 62. The retainer 60 further includes a tab end 70 having side portions 64 which is then folded over within the gooseneck of the hose 66 and then the hose 66 is threaded through ring 68. The tab end 70 prevents the hose 66 from being accidentally removed from the retainer 60. Thus, the tab end 70 inhibits removal of the retainer 60 from the hose 66. A tab 72 is provided on the retainer 60 for receipt in the slot 34 on the back wall 30 of the washing machine 32, as described above with respect to the hose retainer 10. If desired, one of the side portions 64 may be interrupted which will allow the retainer 60 to be attached to the hose 66 in a manner similar to that of the first embodiment 10. The tab end 70 can then be inserted within the gooseneck of the hose 66.

It is understood that the retainers of the present invention can be used on corrugated hose, as shown in the drawings, or on non-corrugated hose.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A hose retaining system, comprising:

a hose;

a substantially flat member having first and second closed ends, and having a first opening in the first end for receiving a first portion of the hose and a second opening in the second end for receiving a second portion of the hose;

the flat member having a web connecting the first and second ends, the web having a hose insertion hole intersecting the first and second openings so as to form therewith an elongated hose insertion opening;

whereby when the hose has a U-shaped portion between the first and second portions, the U-shaped portion can be pushed into the member through the hose insertion opening such that the member holds the hose in a U-shape between the first and second openings without threading an end of the hose through any of the openings.

2. The hose retaining system of claim 1 wherein the member is a molded plastic piece.

3. The hose retaining system of claim 1 further comprising a tab on the flat member for attaching the member to a support structure.

4. The hose retaining system of claim 1 wherein the member is a stamped plastic piece.

5. The hose retaining system of claim 1 wherein the openings include a ridge for engaging a groove between corrugations in the hose.

6. A hose retaining system, comprising:

a hose;

a first C-shaped ring adapted to receive a first portion of the hose;

a second C-shaped ring adapted to receive a second portion of the hose;

the first and second rings having open sides facing towards one another and being interconnected to form a 360° perimeter edge;

a web connecting the first and second rings;

the rings and web having a one-piece construction; and the rings being adapted to receiving the hose portions without inserting an end of the hose through the rings.

7. The hose retaining system of claim 6 wherein the rings include a ridge for engaging a groove between corrugations in the hose.

8. The hose retaining system of claim 6 further comprising a tab for attaching the retainer to a support structure.

9. In combination with a washing machine with a discharge hose operatively connected thereto, a hose retainer, comprising:

a substantially flat member having first and second closed ends, and enclosing a first opening in the first end for receiving a first portion of a hose and enclosing a second opening in the second end for receiving a second portion of the hose;

the flat member having a web connecting the first and second ends, the web having a hose insertion hole intersecting the first and second openings so as to form therewith an elongated hose insertion opening;

whereby when the hose has a U-shaped portion between the first and second portions, the U-shaped portion can be pushed into the member through the hose insertion opening such that the member holds the hose in a U-shape between the first and second openings without threading an end of the hose through any of the openings.

10. The combination of claim 9 wherein the washing machine includes a wall with a slot, and the hose retainer includes a tab adapted to be received in the slot to support the hose adjacent the wall.

11. The combination of claim 9 wherein the hose is corrugated, and wherein the flat member is thin so as to fit in a groove between corrugations.

12. In combination with a washing machine with a discharge hose operatively connected thereto, a hose retainer, comprising:

a first C-shaped ring adapted to receive a first portion of a hose;

a second C-shaped ring adapted to receive a second portion of a hose;

the first and second rings having open sides facing towards one another and being interconnected to form a 360° perimeter edge;

a web connecting the first and second rings;

the rings and web having a one-piece construction; and the rings being adapted to receiving the hose portions without inserting an end of the hose through the rings.

* * * * *